(12) United States Patent
Park et al.

(10) Patent No.: US 9,389,460 B2
(45) Date of Patent: Jul. 12, 2016

(54) DISPLAY DEVICE INCLUDING SUPPORTING MEMBER HAVING CORNER REFLECTIVE SURFACE

(71) Applicant: Samsung Display Co., Ltd., Yongin, Gyeonggi-Do (KR)

(72) Inventors: Seki Park, Hwaseong-si (KR); Luly Lee, Yongin-si (KR); Seul-Gi Kim, Seoul (KR); Suchang Ryu, Yongin-si (KR); Donghyeon Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/656,826

(22) Filed: Mar. 13, 2015

(65) Prior Publication Data

US 2015/0309366 A1  Oct. 29, 2015

(30) Foreign Application Priority Data

Apr. 23, 2014 (KR) .................. 10-2014-0048777

(51) Int. Cl.
*G02F 1/1333* (2006.01)
*G02F 1/1335* (2006.01)

(52) U.S. Cl.
CPC .... *G02F 1/133605* (2013.01); *G02F 1/133308* (2013.01); *G02F 1/133608* (2013.01); *G02F 2001/133325* (2013.01); *G02F 2001/133328* (2013.01)

(58) Field of Classification Search
CPC .................. G02F 1/133615; G02F 1/133608
USPC .......................................................... 349/58
See application file for complete search history.

(56) References Cited

U.S. PATENT DOCUMENTS

| 7,178,951 | B1 | 2/2007 | Hsiao et al. |
| 7,965,346 | B2 | 6/2011 | Suzuki |
| 2008/0060244 | A1 | 3/2008 | Yang et al. |
| 2011/0292315 | A1* | 12/2011 | Bae ............... G02B 6/0088 349/58 |
| 2012/0019483 | A1 | 1/2012 | Chiang et al. |

FOREIGN PATENT DOCUMENTS

| JP | 3812788 B2 | 6/2006 |
| KR | 10-0293812 B1 | 4/2001 |
| KR | 10-0459218 B1 | 11/2004 |
| KR | 10-0500638 B1 | 7/2005 |
| KR | 10-0519794 B1 | 9/2005 |
| KR | 1020080047181 A | 5/2008 |

* cited by examiner

*Primary Examiner* — Lucy Chien
(74) *Attorney, Agent, or Firm* — Cantor Colburn LLP (57) ABSTRACT

A display device includes a backlight unit which generates light, a display panel which receives the light to display an image, a containing member in which the display panel is accommodated, and a supporting member coupled to the containing member and configured to support an edge portion of the display panel. The supporting member includes first and second supporting part and a coupling part. The first and second supporting parts extend in first and second directions, respectively, along the edge portion of the display panel. The coupling part is coupled to the first and second supporting parts and is configured to connect the first supporting parts to the second supporting parts. The coupling part includes a reflection surface facing a direction different from the first and second directions in a plan view.

18 Claims, 4 Drawing Sheets

DISPLAY DEVICE INCLUDING SUPPORTING MEMBER HAVING CORNER REFLECTIVE SURFACE

This application claims priority to Korean Patent Application No. 10-2014-0048777, filed on Apr. 23, 2014, and all the benefits accruing therefrom under 35 U.S.C. §119, the contents of which are hereby incorporated by reference.

BACKGROUND

1. Field

The invention relates to a display device. More particularly, the invention relates to a display device including a backlight unit.

2. Description of the Related Art

A display device includes a display panel that displays an image, and a backlight unit that generates light and provides the light to the display panel. The backlight unit includes a light source that generates the light, and an optical member, e.g., a diffusion plate, to uniformly distribute the light per unit area of the surface of the display panel. In addition, when a line light source or a point light source is used as the light source, the backlight unit changes the line light source and the point light source to a surface light source, which has a uniform brightness per unit area, using the optical member in order to improve a display quality of the display device.

SUMMARY

One or more exemplary embodiment of the invention provides a display device having improved display quality.

An exemplary embodiment of the invention provides a display device including a backlight unit which generates a light, a display panel which receives the light to display an image, a containing member in which the display panel is accommodated, and a supporting member coupled to the containing member and configured to support an edge portion of the display panel.

The supporting member includes a first supporting part extending in a first direction along the edge portion of the display panel, a second supporting part extending in a second direction different from the first direction along the edge portion of the display panel, and a coupling part coupled to the first and second supporting parts and configured to connect the first supporting part and the second supporting part to each other. The coupling part includes a reflection surface facing a direction different from the first and second directions.

The coupling part may be at a corner portion of the supporting member.

The reflection surface may be at an inner corner portion of the supporting member and may connect a first inner surface of the first supporting part to a second inner surface of the second supporting part.

The reflection surface may be inclined with respect to the first and second inner surfaces in a plan view.

A first side of the coupling part may be coupled to the first supporting part and a second side of the coupling part different from the first side may be coupled to the second supporting part.

The supporting member may have a light reflective property.

The coupling part may include a reflection layer which defines the reflection surface and the reflection layer may have a reflectivity greater than a reflectivity of the supporting member.

The backlight unit may include a light emitting unit to generate the light. The light emitting unit may include a plurality of circuit boards on a bottom portion of the containing member and spaced apart from each other, and a plurality of light emitting diode packages mounted on the circuit boards and arranged in a column direction and a row direction on the bottom portion of the containing member.

The backlight unit may further include a reflection plate and a diffusion plate. The reflection plate may be on the light emitting unit and include a plurality of holes defined therein to respectively correspond to the light emitting diode packages. The diffusion plate may be between the reflection plate and the display panel.

The reflection surface may be inclined with respect to the reflection plate in a cross-sectional view.

According to one or more exemplary embodiments of the invention, the supporting member includes the individual parts described above and may be manufactured by assembling the individual parts with each other, where each of the supporting parts has the shape extending in one direction. Therefore, the supporting parts may be easily manufactured such as by an injection process, and the supporting member and the liquid crystal display panel may be easily assembled with each other.

In addition, the supporting member includes the reflection surface disposed on the inner corner thereof. Accordingly, the difference between the amount of light supplied to the center portion of the diffusion plate and the amount of light supplied to each corner of the diffusion plate may be reduced, and thus the amount of the overall light supplied to the display panel via the diffusion plate becomes uniform. As a result, the corner portions of the display panel being darker than the center portion may be reduced or effectively prevented.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
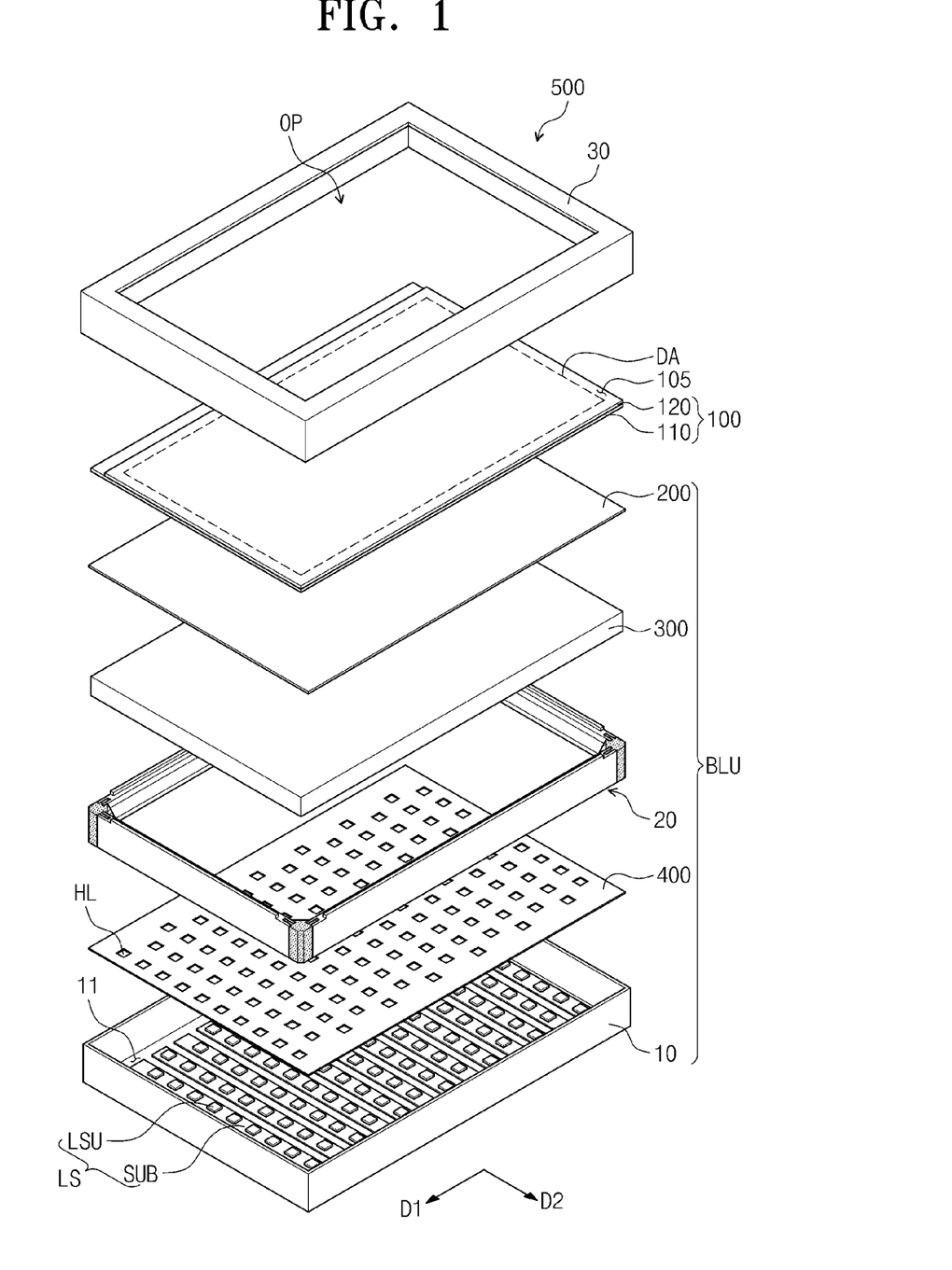
FIG. 1 is an exploded perspective view of an exemplary embodiment of a display device according to the invention.

FIG. 1 is an exploded perspective view of an exemplary embodiment of a display device 500 according to the invention.

Referring to FIG. 1, the display device 500 includes a liquid crystal display panel 100, a backlight unit BLU, a containing member 10, a supporting member 20 and a covering member 30.

The liquid crystal display panel 100 receives a light from the backlight unit BLU to display an image through a display area DA of the liquid crystal display panel 100. The liquid crystal display panel 100 includes a first substrate 110, a second substrate 120, and a liquid crystal layer (not shown) interposed between the first substrate 110 and the second substrate 120.

In the exemplary embodiment, the first substrate 110 includes a plurality of pixels disposed thereon, and each of the pixels includes a pixel electrode (not shown) and a thin film transistor (not shown) to switch a driving signal applied to the pixel electrode. The second substrate 120 includes a common electrode (not shown) and a color filter (not shown), which are disposed thereon. The common electrode forms an electric field, which is applied to the liquid crystal layer, together with the pixel electrodes and the color filter filters the light generated from the backlight unit BLU to provide a color light.

The liquid crystal display panel 100 should not be limited to the above-mentioned structure. According to another exemplary embodiment, for instance, the color filter may be disposed on the first substrate 110, and the common electrode may be disposed on the first substrate 110 along with the pixel electrode.

The backlight unit BLU is accommodated in the containing member 10 and provides the light to the liquid crystal display panel 100. Hereinafter, the structure of the backlight unit BLU will be described in detail.

The backlight unit BLU includes a light emitting unit LS, a reflection plate 400, a diffusion plate 300 and a plurality of sheets 200.

The light emitting unit LS generates the light. In the exemplary embodiment, the light emitting unit LS includes one or more circuit board SUB and a plurality of point light sources LSU such as light emitting diode packages. The backlight unit BLU may include a plurality of light emitting units LS. The circuit boards SUB of the light emitting units LS are accommodated in the containing member 10 and spaced apart from each other on a bottom portion 11 of the containing member 10. The light emitting diode packages LSU are mounted on the circuit boards SUB. Accordingly, the light emitting diode packages LSU are arranged in a row direction and a column direction, e.g., a matrix form, on the bottom portion 11 of the containing member 10.

The reflection plate 400 is disposed on the light emitting unit LS and accommodated in the containing member 10. The reflection plate 400 includes a light reflecting material, such as polyethylene terephthalate ("PET"). A plurality of holes HL are defined in the reflection plate 400, and the holes HL are disposed at positions corresponding to the light emitting diode packages LSU such as in a one-to-one correspondence. Thus, the light emitted from the light emitting diode packages LSU is provided to the diffusion plate 300 through the holes HL, and the light provided from the light emitting diode packages LSU to the reflection plate 400 is reflected by the reflection plate 400.

The diffusion plate 300 is disposed above the reflection plate 400 and the light emitting unit LS and includes a diffusion agent, such as titanium oxide. Therefore, when the light emitted from the light emitting unit LS or the light reflected by the reflection plate 400 is provided to the diffusion plate 300, the light is diffused by the diffusion plate 300, and thus the amount of light provided to the liquid crystal display panel 100 becomes uniform per unit area.

The sheets 200 are disposed between the liquid crystal display panel 100 and the diffusion plate 300. The sheets 200 are configured to include a diffusion sheet diffusing the light, a prism sheet and/or a protection sheet.

The containing member 10 includes the bottom portion 11, and a plurality of sidewalls extending from the bottom portion 11. A containing or receiving space is defined in the containing member 10 by the bottom portion 11 and the sidewalls to accommodate the backlight unit BLU and the liquid crystal display panel 100 therein. The containing member 10 is coupled to the supporting member 20 and the covering member 30, thereby reducing or effectively preventing the backlight unit BLU and the liquid crystal display panel 100 from moving in the containing space.

The supporting member 20 includes portions extending in a first direction D1, and portions extending in a second direction D2 substantially perpendicular to the first direction D1. The extended portions of the supporting member 20 extend along an edge portion 105 of the liquid crystal display panel 100, which corresponds to an outer area of the display area DA. Also, the supporting member 20 is coupled to the sidewalls of the containing member 10 and is configured to support the edge portion 105 of the liquid crystal display panel 100.

The covering member 30 covers the edge portion 105 of the liquid crystal display panel 100 and is configured to support the liquid crystal display panel 100 in cooperation with the supporting member 20. An opening portion OP is defined in the covering member 30 to correspond to the display area DA. Accordingly, the display area DA of the liquid crystal display panel 100 is exposed to the outside of the liquid crystal display panel 100 via the opening portion OP of the covering member 30.

In the exemplary embodiment, the supporting member 20 includes a plurality of separate parts which are assembled together to form the supporting member. The supporting member 20 will be described in detail with reference to FIG. 2.

Figure 2:
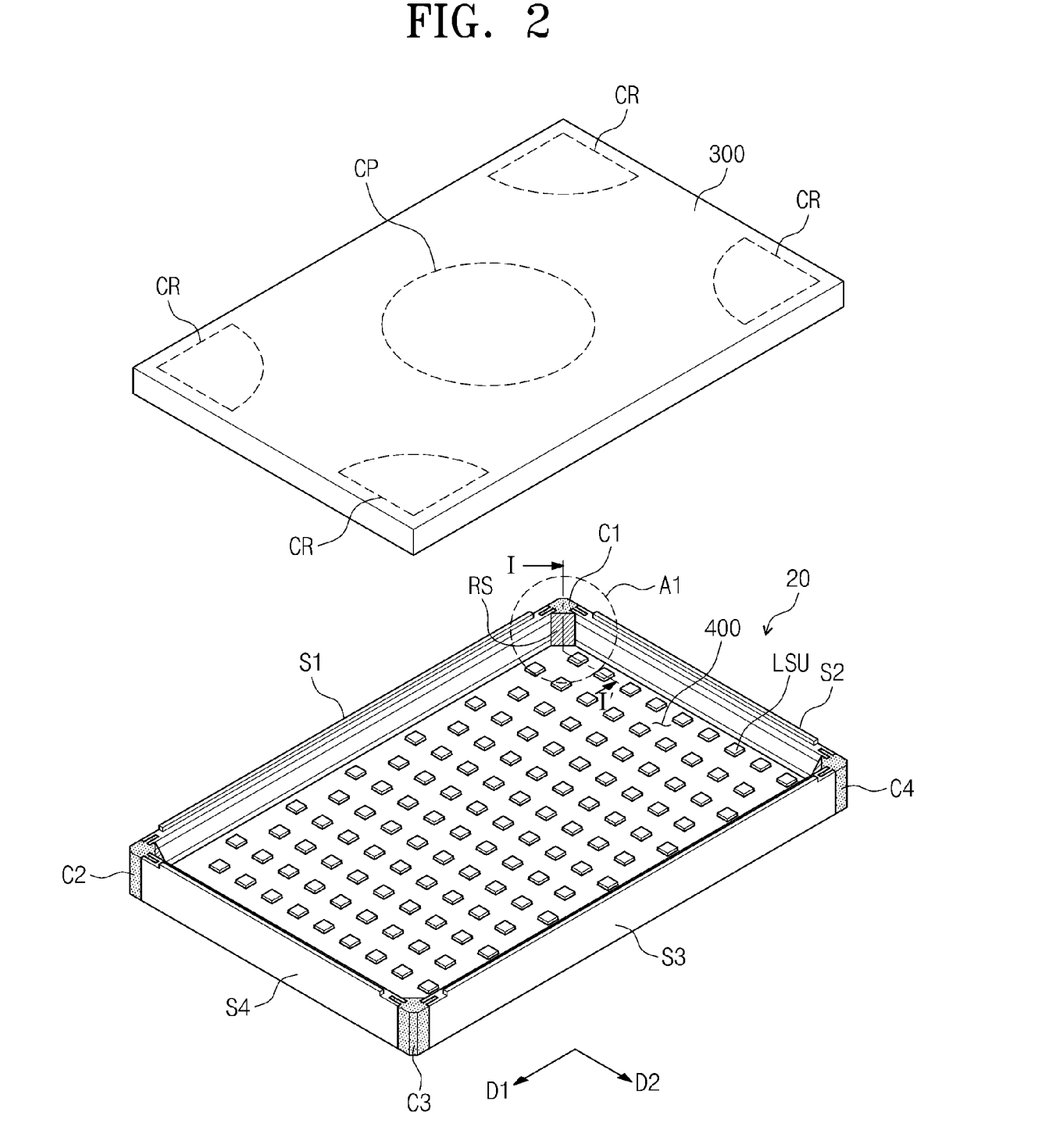
FIG. 2 is a perspective view of an exemplary embodiment of a coupling state of a supporting member, a light emitting unit and a reflection plate, which are shown in FIG. 1.
Figure 3:
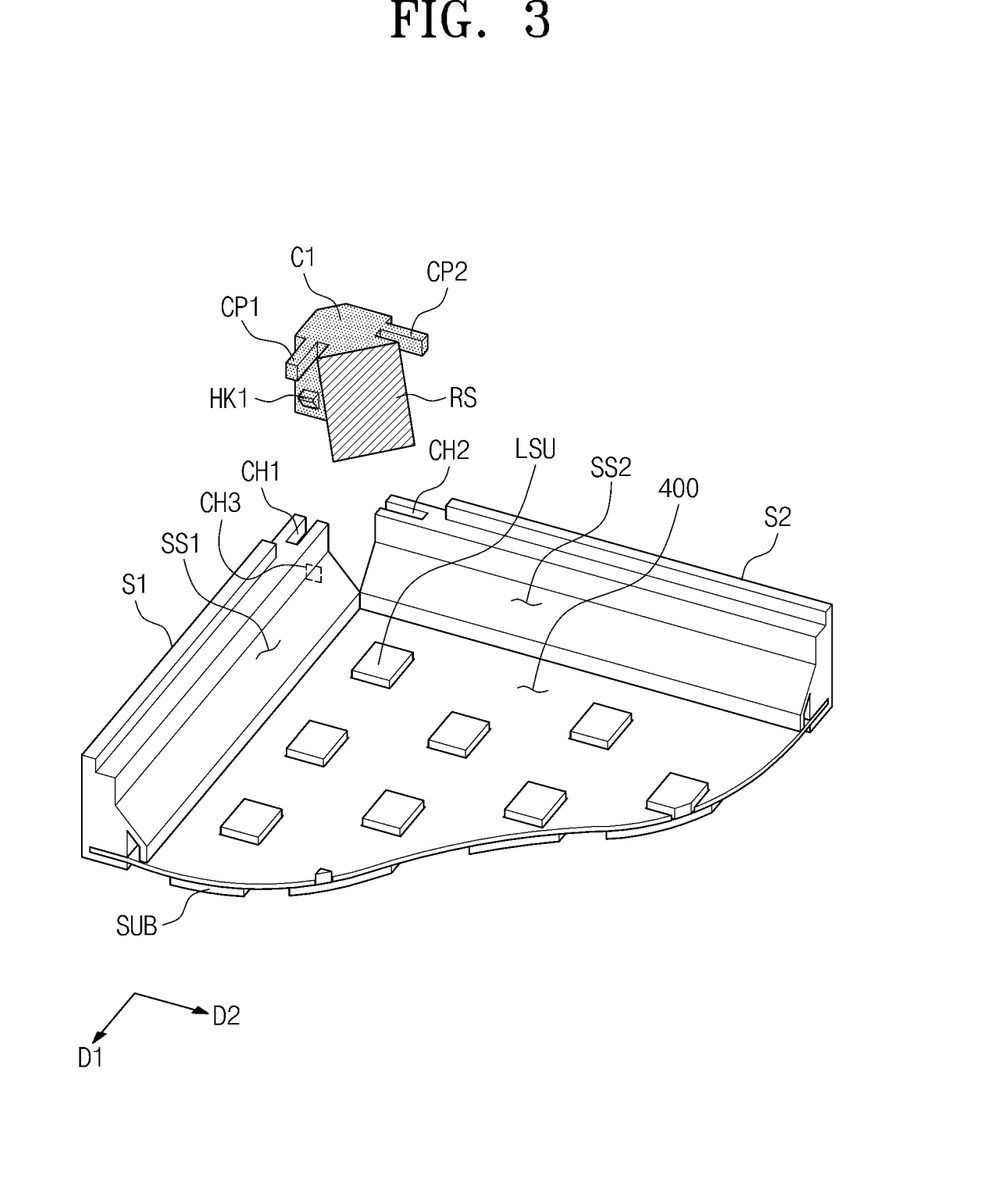
FIG. 3 is an enlarged perspective view of portion A1 shown in FIG. 2.
Figure 4:
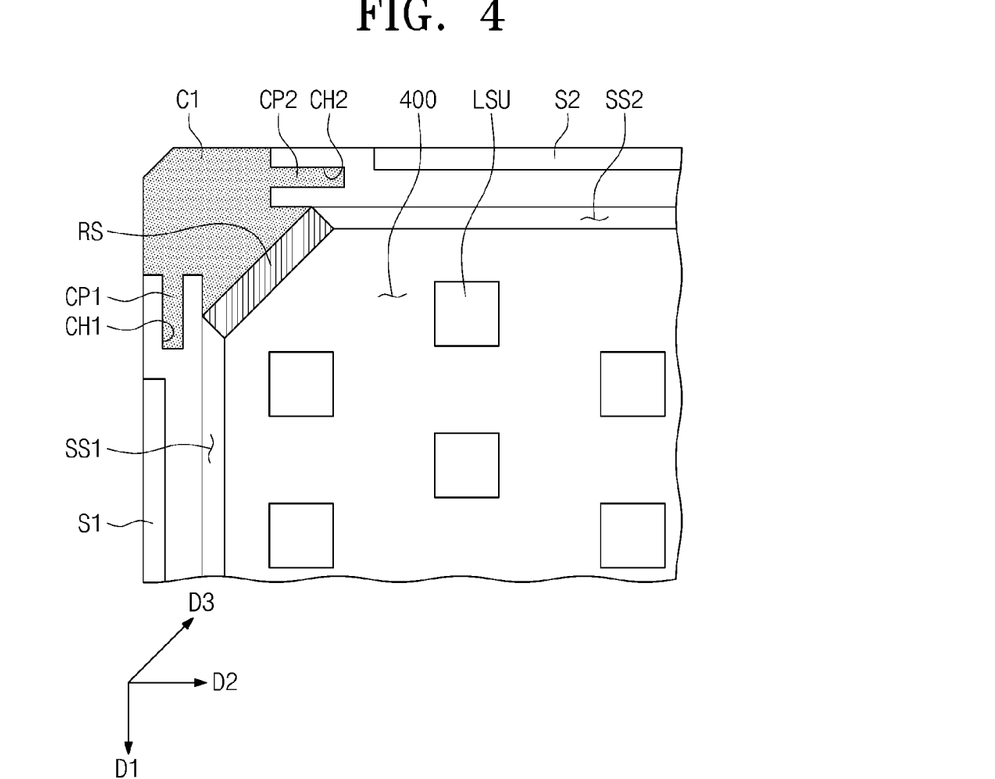
FIG. 4 is a plan view of portion A1 shown in FIG. 2.
Figure 5:
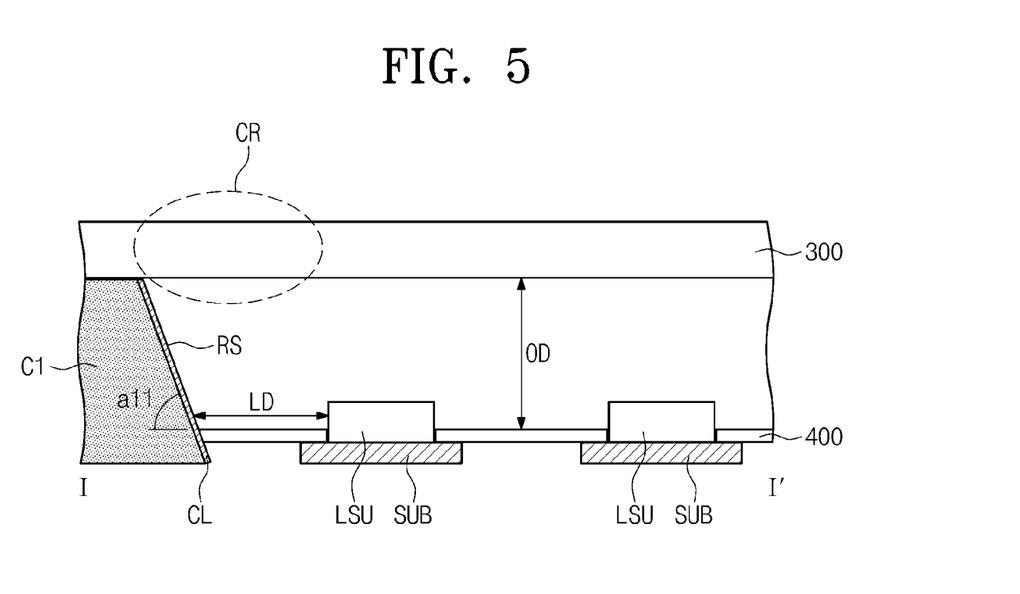
FIG. 5 is a cross-sectional view taken along line I-I' shown in FIG. 2.

FIG. 2 is a perspective view of an exemplary embodiment of a coupling state of the supporting member, the light emitting unit and the reflection plate, which are shown in FIG. 1, FIG. 3 is an enlarged perspective view of portion A1 shown in FIG. 2, FIG. 4 is a plan view of portion A1 shown in FIG. 2, and FIG. 5 is a cross-sectional view taken along line I-I' shown in FIG. 2.

Referring to FIGS. 2 to 5, the supporting member 20 includes the separate parts which are assembled to form the supporting member 20. In detail, the supporting member 20 includes a first supporting part S1, a second supporting part S2, a third supporting part S3, a fourth supporting part S4, a first coupling part C1, a second coupling part C2, a third coupling part C3 and a fourth coupling part C4.

The first and third supporting parts S1 and S3 extend in the first direction D1, and the second and fourth supporting parts S2 and S4 extend in the second direction D2 substantially perpendicular to the first direction D1. The first supporting part S1 faces the third supporting part S3, and the second supporting part S2 faces the fourth supporting part S4.

The first to fourth coupling parts C1 to C4 are disposed to correspond to corners of the supporting member 20 in a one-to-one correspondence. Each of the first to fourth coupling parts C1 to C4 is coupled to two adjacent supporting parts among the first to fourth supporting parts S1 to S4 and is configured to connect the two adjacent supporting parts to each other.

More particularly, the first coupling part C1 is coupled to the first and second supporting parts S1 and S2 and is configured to connect the first supporting part S1 to the second supporting part S2, and the second coupling part C2 is coupled to the first and fourth supporting parts S1 and S4 and is configured to connect the first supporting part S1 to the fourth supporting part S4. In addition, the third coupling part C3 is coupled to the third and fourth supporting parts S3 and S4 and is configured to connect the third supporting part S3 to the fourth supporting part S4, and the fourth coupling part C4 is coupled to the second and third supporting parts S2 and S3 and is configured to connect the second supporting part S2 to the third supporting part S3. As described above, the supporting member 20 includes plural individual parts and is collectively formed by assembling the parts to each other. Each of the first to fourth supporting parts S1 to S4 has a shape extending in one direction, such as in a length direction. Thus, the first to fourth supporting parts S1 to S4 may be easily manufactured by an injection process, and the supporting member 20 and the liquid crystal display panel 100 may be easily assembled with each other. The first to fourth supporting parts S1 to S4 and the first to fourth coupling parts C1 to C4 may be attached and detached from each other such that the supporting member 20 may be easily formed.

The first to fourth supporting parts S1 to S4 and the first to fourth coupling parts C1 to C4 may include a material having a light reflective property. In an exemplary embodiment, for instance, the first to fourth supporting parts S1 to S4 and the first to fourth coupling parts C1 to C4 may include plastic material, such as polyethylene, polypropylene, polycarbonate, etc.

Among the first to fourth supporting parts S1 to S4 and the first to fourth coupling parts C1 to C4, two adjacent parts may be coupled to each other. Hereinafter, one of the coupling structures of the first to fourth supporting parts S1 to S4 and the first to fourth coupling parts C1 to C4 will be described in detail.

Each of the first to fourth coupling parts C1 to C4 includes protrusion portions, and each of the first to fourth supporting parts S1 to S4 includes coupling grooves which are coupled with the protrusion portions. Thus, when the protrusion portions are coupled to the coupling grooves, each of the first to fourth coupling parts C1 to C4 is coupled to two supporting parts adjacent to each other among the first to fourth supporting parts S1 to S4. Hereinafter, the coupling structure between the first coupling part C1 and the first and second supporting parts S1 and S2 will be described in detail as a representative example.

The first coupling part C1 includes a first protrusion portion CP1 and a second protrusion portion CP2. The first protrusion portion CP1 has a shape protruding from one side of a base portion of the first coupling part C1 toward the first supporting part S1, and the second protrusion portion CP2 has a shape protruding from another side of a base portion of the first coupling part C1 toward the second supporting part S2. In addition, the first supporting part S1 includes a first coupling groove CH1 defined therein to accommodate the first protrusion portion CP1 and the second supporting part S2 includes a second coupling groove CH2 defined therein to accommodate the second protrusion portion CP2.

Accordingly, where the first and second protrusion portions CP1 and CP2 are coupled to the first and second coupling grooves CH1 and CH2, respectively, the first coupling part C1 is coupled to both the first and second supporting parts S1 and S2, and thus the first supporting part S1 is connected to the second supporting part S2 via the first coupling part C1. Also, when the first and second protrusion portions CP1 and CP2 are separated from the first and second coupling grooves CH1 and CH2, the first coupling part C1, the first supporting part S1 and the second supporting part S2 are disassembled from each other.

In the exemplary embodiment, each of the first and second protrusion portions CP1 and CP2 has a rectilinear or hexagonal shape, but is not limited thereto or thereby. In an exemplary embodiment, for instance, each of the first and second protrusion portions CP1 and CP2 may have a hemispherical shape. Where the first and second protrusion portions CP1 and CP2 have a hemispherical shape, the first coupling groove CH1 may be defined in the first supporting part S1 by a hemispherical-shaped recess, and the second coupling groove CH2 may be defined in the second supporting part S2 by a hemispherical-shaped recess.

The first coupling part C1 may further include one or more hook portion HK1 in addition to the first and second protrusion portions CP1 and CP2. The hook portion HK1 may be coupled to a third coupling groove CH3 defined at one side of the first supporting part S1.

A groove or recess may be defined at a lower portion of the first to fourth supporting parts S1 to S4. Referring to FIG. 3, the recess may be configured to accept an edge portion of the reflection plate 400.

The first to fourth coupling parts C1 to C4 may include reflection surfaces disposed to correspond to inner corners of the supporting member 20 in a one-to-one correspondence. Hereinafter, descriptions on the structure and function of the reflection surface RS of the first coupling part C1 among the reflection surfaces will be described in detail as a representative example.

The reflection surface RS is disposed at the inner corner of the supporting member 20, which is defined by the first and second supporting parts S1 and S2 adjacent to each other. In detail, the reflection surface RS connects a first inner surface SS1 of the first supporting part S1 to a second inner surface SS2 of the second supporting part S2. The reflection surface RS, the first inner surface SS1 and the second inner surface SS2 may effectively form a continuous inner surface of the supporting member 20, referring to FIG. 4, for example. Thus, the reflection surface RS reduces or effectively prevents the light provided from the light emitting diode packages LSU from leaking through a space between the first coupling part C1 and the first supporting part S1 and/or a space between the first coupling part C1 and the second supporting part S2.

In the exemplary embodiment, the first inner surface SS1 is in parallel to the first direction D1, the second inner surface SS2 is in parallel to the second direction D2, and the reflection surface RS is in parallel to a third direction D3 different from the first and second directions D1 and D2 when viewed in a plan view. That is, the reflection surface RS may be inclined with respect to the first and second inside surfaces SS1 and SS2 when viewed in a plan view.

Referring to FIG. 3, ends of lower portions of adjacent supporting parts S1 and S2 may be disposed at a distance from each other, while upper portions thereof may be disposed at a distance from each other greater than that of the lower ends. Referring to FIGS. 3 and 4, the refection surface RS of the first coupling part C1 may overlap a gap formed between the ends of the adjacent supporting parts S1 and S2, when the first coupling part C1 is engaged with the first and second supporting parts S1 and S2.

The reflection surface RS is disposed to face an upward direction of the supporting member 20, such as towards the liquid crystal display panel 100. Thus, the reflection surface RS is inclined with respect to the reflection plate 400 when viewed in a cross-sectional view, and the light generated from the light emitting diode packages LSU and reflected by the reflection surface RS may travel to the diffusion plate 300, and the display panel 100 (refer to FIG. 1) disposed on the diffusion plate 300.

When an angle of the reflection surface RS with respect to the reflection plate 300, a distance between the reflection surface RS and a light emitting diode package LSU disposed nearest to the reflection surface RS among the light emitting diode packages LSU, and a distance between the reflection plate 400 and the diffusion plate 300 are respectively defined as an inclined angle a11, a distance LD and an optical distance OD, the inclined angle a11 may be changed depending on the optical distance OD or the distance LD. In an exemplary embodiment, for instance, when the optical distance OD is about 33 millimeters and the distance LD is about 10 millimeters, the inclined angle a11 may be about 40 degrees.

In the exemplary embodiment, as the optical distance OD decreases, the inclined angle a11 becomes smaller. Thus, although the optical distance OD is decreased, a decrease in the amount of light provided to corner portions CR of the diffusion plate 300 may be reduced or effectively since the inclined angle a11 becomes smaller corresponding to the decrease of the optical distance OD.

Assuming that a first amount of light is provided to a center portion CP of the diffusion plate 300 and a second amount of light is provided to each of the corner portions CR of the diffusion plate 300, the amount of light provided to the display panel 100 (refer to FIG. 1) through the diffusion plate 300 becomes uniform per unit area as the difference between the first amount of light and the second amount of light becomes smaller.

Different from the exemplary embodiment, in a conventional display device in which the first coupling part C1 does not include the reflection surface RS, the difference between the first amount of light and the second amount of light increases since the second amount of light becomes smaller as the distance LD increases. Accordingly, the brightness in each of the corner portions of the display panel of the conventional display device is lower than the brightness of the center portion of the display panel, and thus a dark portion occurs in the corner portions of the display panel. However, in one or more exemplary embodiment according to the invention, the second amount of light is compensated by the reflection surface RS, so that the corner portions CR of the display panel being darker than the center portion CP thereof is reduced or effectively prevented.

The reflection surface RS has a reflectivity greater than a reflectivity of each of the first coupling part C1, the first supporting part S1 and the second supporting part S2. In an exemplary embodiment, for instance, the first coupling part C1, which includes the plastic material having the light reflective property, has the reflectivity of about 90%. In addition, the first coupling part C1 includes a reflection layer CL disposed on the reflection surface RS and including titanium oxide or a white pigment, and the reflection surface RS has the reflectivity of about 98%. When the reflection surface RS has the reflectivity greater than that of the first coupling part C1, the amount of light reflected by the reflection surface RS and provided to the corner portions CR of the diffusion plate 300 is sufficiently secured even though the reflection surface RS has a small planar area.

In an exemplary embodiment of manufacturing the display device 500, the reflection layer CL is coated on coupling part to define the reflection surface RS, but is not limited thereto or thereby. That is, according to an alternative exemplary embodiment, the reflection layer CL may be a reflective tape, e.g., aluminum or silver, attached to the coupling part to define the reflection surface RS, or the reflection layer CL may be realized by performing a mirroring treatment on the coupling part to define the reflection surface RS.

In the exemplary embodiment, the reflection surface RS has a rectangular planar shape. However, according to an exemplary embodiment, the reflection surface RS may have a triangular planar shape or the reflection surface RS may have a rounded planar shape and/or rounded side.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a backlight unit which generates a light;
    a display panel which receives the light to display an image;
    a containing member in which the backlight unit is accommodated; and
    a supporting member coupled to the containing member and configured to support an edge portion of the display panel,
    wherein the supporting member comprises:
        a first supporting part extending in a first direction along the edge portion of the display panel;
        a second supporting part extending in a second direction different from the first direction along the edge portion of the display panel; and
        a coupling part coupled to the first and second supporting parts and configured to connect the first supporting part to the second supporting part to each other,
        wherein the coupling part comprises a reflection surface facing a direction different from the first and second directions.

2. The display device of claim 1, wherein the coupling part is at a corner portion of the supporting member.

3. The display device of claim 2, wherein the reflection surface is at an inner corner portion of the supporting member.

4. The display device of claim 3, wherein
    the first supporting part comprises a first inner surface and the second supporting part comprises a second inner surface, and
    the reflection surface of the coupling part connects the first inner surface of the first supporting part to the second inner surface of the second supporting part.

5. The display device of claim 4, wherein the reflection surface is inclined with respect to the first and second inner surfaces, in a plan view.

6. The display device of claim 2, wherein
    a first side of the coupling part is coupled to the first supporting part, and
    a second side of the coupling part different from the first side is coupled to the second supporting part.

7. The display device of claim 2, wherein the supporting member has a light reflective property.

8. The display device of claim 7, wherein the coupling part comprises a reflection layer which defines the reflection surface, and the reflection layer has a reflectivity greater than a reflectivity of the supporting member.

9. The display device of claim 8, wherein the reflection layer comprises a coating on the coupling part to define the reflection surface.

10. The display device of claim 8, wherein the reflection layer comprises a reflection tape on the coupling part to define the reflection surface.

11. The display device of claim 1, wherein the backlight unit comprises a light emitting unit which generates the light, and the light emitting unit comprises:
    a plurality of circuit boards on a bottom portion of the containing member and spaced apart from each other; and
    a plurality of light emitting diode packages mounted on the circuit boards and arranged in a column direction and a row direction on the bottom portion of the containing member.

12. The display device of claim 11, wherein the backlight unit further comprises:
    a reflection plate on the light emitting unit, and a plurality of holes defined therein and corresponding to the light emitting diode packages; and
    a diffusion plate between the reflection plate and the display panel.

13. The display device of claim 12, wherein the reflection surface is inclined with respect to the reflection plate, in a cross-sectional view.

14. The display device of claim 13, wherein a reduction in a distance between the reflection plate and the diffusion plate decreases an acute angle between the reflection plate and the reflection surface.

15. A method of manufacturing a display device, comprising:
    providing a backlight unit which generates a light;
    accommodating the backlight unit in a containing member;
    providing a display panel which receives the light to display an image;
    assembling a supporting member which is configured to support an edge portion of the display panel; and
    coupling the supporting member to the containing member,
    wherein the assembling the supporting member comprises:
        providing a first supporting part which extends in a first direction along the edge portion of the display panel;
        providing a second supporting part which extends in a second direction different from the first direction along the edge portion of the display panel; and
        coupling a single coupling part configured to connect the first supporting part to the second supporting part to each other, to the first and second supporting parts; and disposing a reflection surface of the single coupling part to face a direction different from the first and second directions.

16. The method of claim 15, wherein the coupling the single coupling part disposes the single coupling part at a corner portion of the supporting member, and disposes the reflection surface facing a receiving space of the containing member.

17. The method of claim 15, wherein the coupling the single coupling part disposes the reflection surface inclined with respect to the display panel in a cross-sectional view, and inclined with respect to the first and second supporting parts in a plan view.

18. The method of claim 15, wherein the supporting member has a light reflective property, and the reflection surface has a reflectivity greater than a reflectivity of the supporting member.

* * * * *